United States Patent
Kuwahara et al.

(10) Patent No.: US 10,513,253 B2
(45) Date of Patent: Dec. 24, 2019

(54) SHIFT CONTROL DEVICE AND SHIFT CONTROL METHOD FOR HYBRID VEHICLE

(71) Applicant: TOYOTA JIDOSHA KABUSHIKI KAISHA, Toyota-shi, Aichi-ken (JP)

(72) Inventors: Seiji Kuwahara, Susono (JP); Yusuke Suzuki, Hadano (JP); Naoki Nakanishi, Susono (JP); Kunihiko Usui, Fuji (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 165 days.

(21) Appl. No.: 15/843,792

(22) Filed: Dec. 15, 2017

(65) Prior Publication Data
US 2018/0178776 A1   Jun. 28, 2018

(30) Foreign Application Priority Data

Dec. 26, 2016 (JP) ................................. 2016-251167

(51) Int. Cl.

| | |
|---|---|
| *B60W 30/182* | (2012.01) |
| *B60W 10/06* | (2006.01) |
| *B60W 10/08* | (2006.01) |
| *B60W 10/11* | (2012.01) |
| *B60K 6/48* | (2007.10) |
| *B60W 20/30* | (2016.01) |
| *F16H 61/02* | (2006.01) |
| *F16H 59/44* | (2006.01) |
| *B60W 30/18* | (2012.01) |

(52) U.S. Cl.
CPC ............ *B60W 10/11* (2013.01); *B60W 20/30* (2013.01); *B60W 30/182* (2013.01); *F16H 61/0213* (2013.01); *B60W 30/18127* (2013.01); *B60Y 2200/92* (2013.01); *F16H 59/44* (2013.01); *Y10S 903/945* (2013.01)

(58) Field of Classification Search
CPC . B60K 6/48; B60K 2006/4825; B60W 10/06; B60W 10/08; B60W 10/11; B60W 30/182
See application file for complete search history.

(56) References Cited

U.S. PATENT DOCUMENTS

2014/0051545 A1* 2/2014 Berry .................. B60K 6/48
477/3
2014/0221156 A1* 8/2014 Sugimura ............ B60W 10/06
477/83

FOREIGN PATENT DOCUMENTS

| | | |
|---|---|---|
| JP | H10-103111 A | 4/1998 |
| JP | 2010-058557 A | 3/2010 |

* cited by examiner

*Primary Examiner* — David R Morris
(74) *Attorney, Agent, or Firm* — Oliff PLC

(57) ABSTRACT

A shift control device is configured to control switching between shift stages in a multi-stage automatic transmission such that a gear ratio selected at a predetermined vehicle speed and selected in a regenerative traveling mode that is a boundary region with respect to an EV traveling mode becomes greater than a gear ratio selected at the predetermined vehicle speed and selected in an HV traveling mode that is a boundary region with respect to the EV traveling mode, and is configured to control the switching between the shift stages such that a gear ratio of a shift stage selected when the traveling mode is switched from the regenerative traveling mode to the EV traveling mode is greater than a gear ratio of a shift stage selected when the traveling mode is switched from the HV traveling mode to the EV traveling mode under the same vehicle speed and parameter.

5 Claims, 6 Drawing Sheets

SHIFT CONTROL DEVICE AND SHIFT CONTROL METHOD FOR HYBRID VEHICLE

INCORPORATION BY REFERENCE

The disclosure of Japanese Patent Application No. 2016-251167 filed on Dec. 26, 2016 including the specification, drawings and abstract is incorporated herein by reference in its entirety.

BACKGROUND

1. Technical Field

The disclosure relates to a shift control device for a hybrid vehicle in which a multi-stage automatic transmission is installed and a shift control method.

2. Description of Related Art

A deceleration energy regenerating system, in which a portion of kinetic energy that is wasted as thermal energy is recovered as pressure energy when a vehicle decelerates while traveling and the pressure energy is used at the time of acceleration of the vehicle, has been proposed in Japanese Unexamined Patent Application Publication No. 10-103111 (JP 10-103111 A). In JP 10-103111 A, in a case where an engine that is in a stopped state at the time of regeneration of kinetic energy is started with a regenerating process of the kinetic energy being finished, a shifting operation is prohibited for a predetermined period of time. Accordingly, it is possible to prevent a shock that occurs due to the start of the engine and a shock that occurs due to the shifting operation from overlapping with each other.

SUMMARY

There is proposed a hybrid vehicle in which a multi-stage automatic transmission that is able to achieve eight to ten forward shift stages by using a combination of a plurality of planetary gear trains and a plurality of frictional engaging elements that corresponds to the planetary gear trains, an internal combustion engine functioning as a prime mover, and a rotating electric machine functioning as a prime mover are combined with each other. It is possible to further expand the operating region of a vehicle, in which an engine and a rotating electric machine are able to operate in the most efficient rotation region, in comparison with the related art when using such a multi-stage automatic transmission in combination.

In the hybrid vehicle, an HV traveling mode in which output from the internal combustion engine is transferred to drive wheels and an EV traveling mode in which output from the rotating electric machine is transferred to the drive wheels are different from each other in optimal shift stage under the same vehicle speed and the same accelerator operation amount. Typically, the rotating electric machine is higher than the internal combustion engine in most efficient rotation speed and thus it is possible to improve fuel efficiency by setting a gear ratio selected in the HV traveling mode to be smaller than a gear ratio selected in the EV traveling mode under the same vehicle speed and the same accelerator operation amount. In addition, in the EV traveling mode, the rotating electric machine needs to have remaining power to start the internal combustion engine at all times and maximum output to the drive wheels is limited in the high-rotation region and the low-rotation region of the rotating electric machine. As a result, an EV traveling region becomes narrow. Furthermore, when the traveling mode is switched between the HV traveling mode and the EV traveling mode and there is excessive divergence between selected gear ratios along with the switching, an excessive shift shock occurs. For this reason, it has been conceived to further suppress deterioration in drivability by setting a gear ratio in the EV traveling mode to be smaller than a gear ratio selected in a regenerative traveling mode.

In a hybrid vehicle in which a multi-stage automatic transmission, of which the regeneration efficiency is improved by setting a gear ratio selected in the regenerative traveling mode to be greater than a gear ratio selected in the EV traveling mode with respect to a boundary region between the EV traveling region and a regenerative traveling region, is installed, in a case where an accelerator pedal is stepped on during the regenerative traveling mode and thus the traveling mode is switched to the EV traveling mode, an upshifting operation is performed even when the vehicle speed stays the same. However, since the EV traveling mode and the regenerative traveling mode are not different from each other in most efficient rotation speed of the rotating electric machine, the upshifting operation being performed may result in a decrease in fuel efficiency.

In addition, in a case where a driver's stepping-on amount with respect to the accelerator pedal is further increased, the internal combustion engine may be started along with downshifting or switching to the HV traveling mode and there is a possibility of deterioration in drivability.

Furthermore, in a case where a gear ratio selected in the EV traveling mode and a gear ratio selected in the regenerative traveling mode are set to be the same as each other in the boundary region between the EV traveling region and the regenerative traveling region, divergence between the gear ratio in the EV traveling mode and the gear ratio in the regenerative traveling mode that are selected in a boundary region between the EV traveling mode and the HV traveling mode becomes large. In addition, in a case where the engine needs to be started or stopped at the same time as switching between the traveling regions, there is further deterioration in drivability due to a rapid change in gear ratio.

The disclosure provides a shift control device for a hybrid vehicle with which it is possible to further suppress deterioration in drivability caused by a shift shock that occurs due to switching from a regenerative traveling mode to an EV traveling mode or an HV traveling mode and in which a preferable gear ratio is set in each traveling mode and a shift control method.

A first aspect of the disclosure relates to a shift control device for a hybrid vehicle in which an internal combustion engine configured to drive drive wheels, a rotating electric machine configured to drive the drive wheels as a motor and to supply power to an in-vehicle secondary battery as a power generator, and a multi-stage automatic transmission that is disposed between the internal combustion engine and the drive wheels and between the rotating electric machine and the drive wheels and that achieves one of a plurality of shift stages are installed and in which an EV traveling mode that is selected in a low-drive region where a vehicle driving force is greater than zero and in which fuel is not supplied to the internal combustion engine and output from the rotating electric machine is transferred to the drive wheels, an HV traveling mode that is selected in a high-drive region where a vehicle driving force is greater than the vehicle driving force in the low-drive region and in which output from at least the internal combustion engine out of the internal combustion engine and the rotating electric machine is transferred to the drive wheels, and a regenerative traveling mode that is selected in a region where a vehicle driving force is smaller than zero and in which power obtained when the rotating electric machine is driven with rotation energy from the drive wheels is stored in the secondary battery when an accelerator is released while a vehicle is traveling are set. The shift control device includes an electronic control unit. The electronic control unit is configured to control switching between the shift stages in the multi-stage automatic transmission based on the vehicle speed and a parameter related to the vehicle driving force. The electronic control unit is configured to control the switching between the shift stages in the multi-stage automatic transmission such that a gear ratio that is selected at a predetermined vehicle speed and is selected in the regenerative traveling mode that is a boundary region with respect to the EV traveling mode becomes greater than a gear ratio that is selected at the predetermined vehicle speed and is selected in the HV traveling mode that is a boundary region with respect to the EV traveling mode. The electronic control unit is configured to control the switching between the shift stages in the multi-stage automatic transmission such that a gear ratio of a shift stage that is selected in a case where a traveling mode is switched from the regenerative traveling mode to the EV traveling mode is greater than a gear ratio of a shift stage that is selected in a case where the traveling mode is switched from the HV traveling mode to the EV traveling mode under the same vehicle speed and the same parameter in a case where the traveling mode is switched from the regenerative traveling mode to the EV traveling mode and in a case where the traveling mode is switched from the HV traveling mode to the EV traveling mode.

According to the first aspect of the disclosure, the switching between the shift stages is performed such that the gear ratio that is selected at the predetermined vehicle speed and is selected in the HV traveling mode that is the boundary region with respect to the EV traveling mode becomes greater than the gear ratio that is selected at the predetermined vehicle speed and is selected in the regenerative traveling mode that is the boundary region with respect to the EV traveling mode.

In addition, the shift stage that is selected in the case where the traveling mode is switched from the regenerative traveling mode to the EV traveling mode is lower than the shift stage that is selected in the case where the traveling mode is switched from the HV traveling mode to the EV traveling mode under the same vehicle speed and the same parameter, the parameter being related to the vehicle driving force. That is, even in the same EV traveling mode, in a case where the traveling mode is switched from the regenerative traveling mode to the EV traveling mode, the rotation speed of the rotating electric machine is changed to be higher than that in a case where the traveling mode is switched from the HV traveling mode to the EV traveling mode.

In the shift control device according to the first aspect of the disclosure, the electronic control unit may be configured to perform upshifting to a shift stage that is equal to or lower than a shift stage pertaining to a case where the traveling mode is switched from the HV traveling mode to the EV traveling mode after a shift stage is maintained for a predetermined time, in a case where the traveling mode is switched from the regenerative traveling mode to the EV traveling mode.

In the shift control device according to the first aspect of the disclosure, the electronic control unit may be configured to perform the upshifting to the shift stage that is equal to or lower than the shift stage pertaining to the case where the traveling mode is switched from the HV traveling mode to the EV traveling mode without maintaining the shift stage for the predetermined time in a case where the traveling mode is switched from the regenerative traveling mode to the EV traveling mode and the rotation speed of the rotating electric machine is higher than a predetermined rotation speed.

According to the first aspect of the disclosure, shift stages that are selected in a case where the traveling mode is switched from the regenerative traveling mode to the EV traveling mode include both of the shift stage that is maintained for the predetermined time and the shift stage that is selected after the maintenance for the predetermined time.

In the shift control device according to the first aspect of the disclosure, the electronic control unit may be configured to control the switching between the shift stages in the multi-stage automatic transmission such that a gear ratio of a shift stage that is selected in the EV traveling mode in a boundary region between the HV traveling mode and the EV traveling mode becomes equal to or greater than a gear ratio of a shift stage that is selected in the HV traveling mode under the same vehicle speed and the same parameter.

According to the first aspect of the disclosure, in a case where the traveling mode is switched from the regenerative traveling mode to the EV traveling mode, the rotation speed of the rotating electric machine is changed to be higher than that in a case where the traveling mode is switched from the HV traveling mode to the EV traveling mode under the same vehicle speed. Therefore, even in a case where the traveling mode is switched to the HV traveling mode immediately after the traveling mode is switched from the regenerative traveling mode to the EV traveling mode, it is possible to efficiently avoid deterioration in drivability.

Since a shift stage that is selected in the regenerative traveling mode is maintained for a predetermined time in a case where the traveling mode is switched from the regenerative traveling mode to the EV traveling mode, the rotation speed of the rotating electric machine is maintained at a high-rotation region where efficiency becomes favorable and fuel efficiency can be improved. However, since switching to a shift stage that is selected in the EV traveling mode is immediately performed in a case where the rotation speed of the rotating electric machine is higher than the predetermined rotation speed, it is possible to efficiently avoid deterioration in drivability even in a situation of switching to the HV traveling mode once more.

Since a shift stage of which the gear ratio is greater than that of a shift stage selected in the HV traveling mode, that is, a low shift stage, is selected as a shift stage in the EV traveling mode under the same vehicle speed and the same parameter, it is possible to operate the rotating electric machine and the internal combustion engine at an efficient rotation speed.

A second aspect of the disclosure relates to a shift control method for a hybrid vehicle in which an internal combustion engine configured to drive drive wheels, a rotating electric machine configured to drive the drive wheels as a motor and to supply power to an in-vehicle secondary battery as a power generator, and a multi-stage automatic transmission that is disposed between the internal combustion engine and the drive wheels and between the rotating electric machine and the drive wheels and that achieves one of a plurality of shift stages are installed and in which an EV traveling mode that is selected in a low-drive region where a vehicle driving force is greater than zero and in which fuel is not supplied to the internal combustion engine and output from the rotating electric machine is transferred to the drive wheels, an HV traveling mode that is selected in a high-drive region where a vehicle driving force is greater than the vehicle driving force in the low-drive region and in which output from at least the internal combustion engine out of the internal combustion engine and the rotating electric machine is transferred to the drive wheels, and a regenerative traveling mode that is selected in a region where a vehicle driving force is smaller than zero and in which power obtained when the rotating electric machine is driven with rotation energy from the drive wheels is stored in the secondary battery when an accelerator is released while a vehicle is traveling are set. The shift control method includes controlling switching between the shift stages in the multi-stage automatic transmission based on a vehicle speed and a parameter related to a vehicle driving force, controlling the switching between the shift stages in the multi-stage automatic transmission such that a gear ratio that is selected at a predetermined vehicle speed and is selected in the regenerative traveling mode that is a boundary region with respect to the EV traveling mode becomes greater than a gear ratio that is selected at the predetermined vehicle speed and is selected in the HV traveling mode that is a boundary region with respect to the EV traveling mode, and controlling the switching between the shift stages in the multi-stage automatic transmission such that a gear ratio of a shift stage that is selected in a case where a traveling mode is switched from the regenerative traveling mode to the EV traveling mode is greater than a gear ratio of a shift stage that is selected in a case where the traveling mode is switched from the HV traveling mode to the EV traveling mode under the same vehicle speed and the same parameter in a case where the traveling mode is switched from the regenerative traveling mode to the EV traveling mode and in a case where the traveling mode is switched from the HV traveling mode to the EV traveling mode.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

An embodiment of a shift control device for a hybrid vehicle according to an aspect of the disclosure will be described in detail with reference to FIGS. 1 to 6. However, the aspect of the disclosure is not limited to the embodiment and can be applied to every shift control device for a hybrid vehicle that includes a configuration as described in at least claim 1 out of claims.

Figure 1:
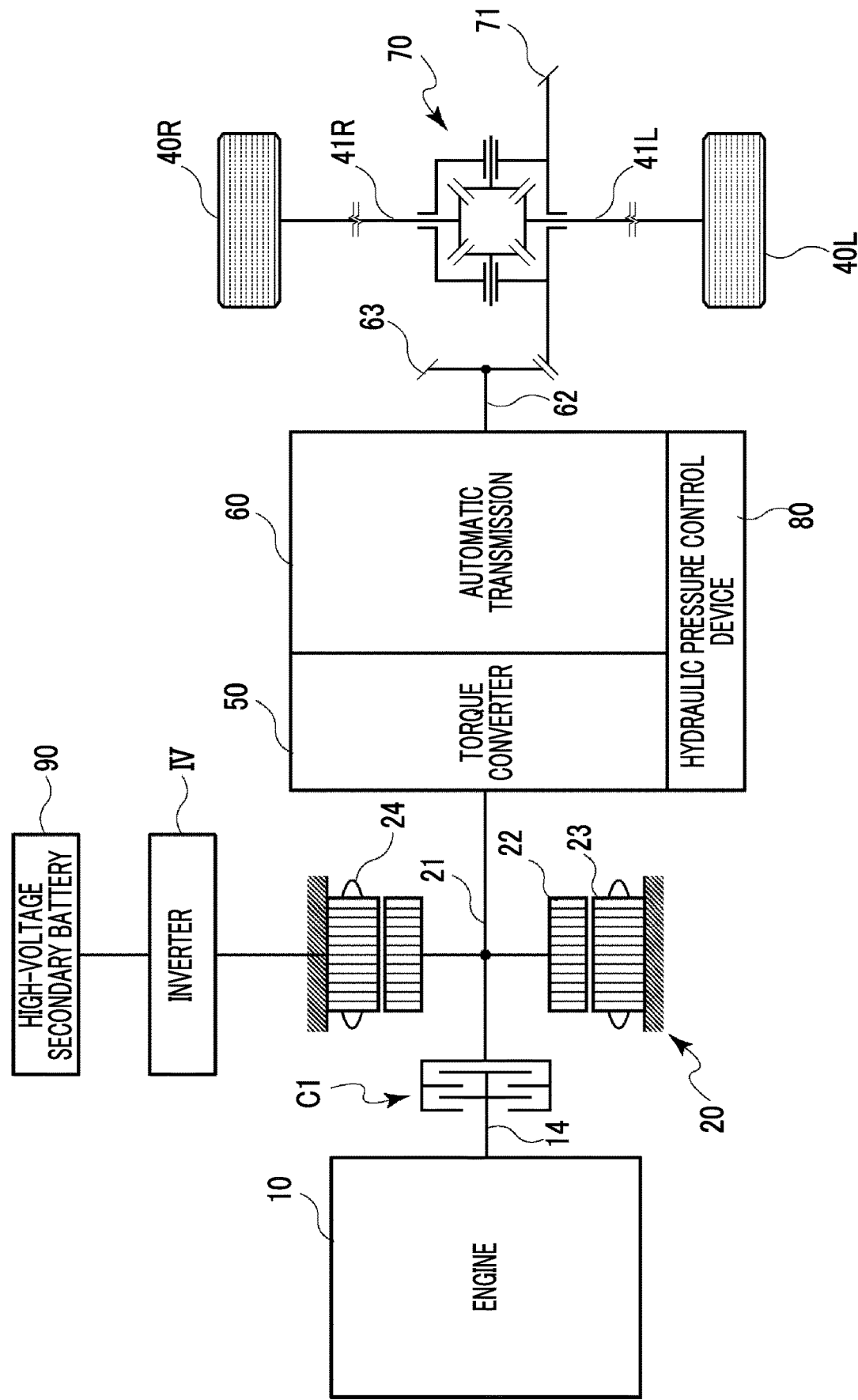
FIG. 1 is a conceptual diagram schematically illustrating a schematic configuration of a driving system according to an embodiment of a hybrid vehicle to which the aspect of the disclosure is applied.
Figure 2:
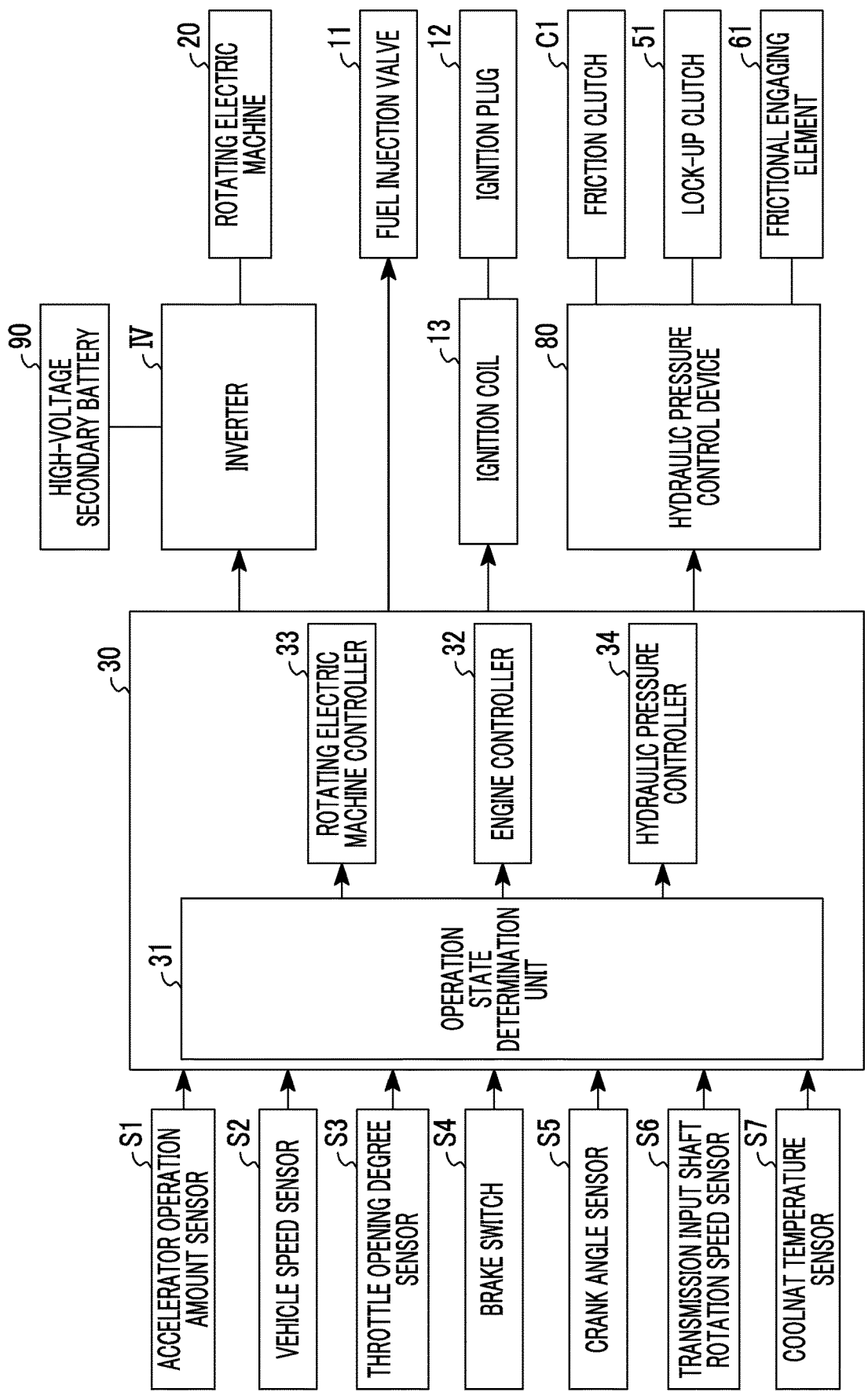
FIG. 2 is a control block diagram of main components in the embodiment illustrated in FIG. 1.

FIG. 1 schematically illustrates a schematic configuration of a hybrid vehicle in the embodiment and FIG. 2 illustrates a control block of main components in the embodiment illustrated in FIG. 1. In the hybrid vehicle in the embodiment, one engine 10 and one rotating electric machine 20 are installed as prime movers and the engine 10 is a spark-ignition direct injection internal combustion engine in which fuel is directly injected to a combustion chamber (not shown) from a fuel injection valve 11. However, the aspect of the disclosure is not limited to this. The amount of fuel supplied to the combustion chamber from the fuel injection valve 11 and the timing of injection are controlled by an engine controller 32 of an electronic control unit (ECU) 30 based on information from an operation state determination unit 31 of the ECU 30. The stepping-on amount with respect to an accelerator pedal (not shown) that is operated by a driver is detected by an accelerator operation amount sensor 51 and detection information indicating the result of the detection is output to the ECU 30. The operation state determination unit 31 of the ECU 30 determines the operation state of a vehicle including the accelerator operation amount and controls the opening degree of a throttle valve (not shown) disposed in an intake path (not shown) of the engine 10, that is, the throttle opening degree, based on the result of the determination. In addition, the timing of ignition of the ignition plug 12 is also set by the engine controller 32 of the ECU 30 based on information from the operation state determination unit 31 of the ECU 30. The engine controller 32 of the ECU 30 drives an ignition coil 13 such that the ignition plug 12 causes a spark discharge at the timing of ignition that is set as described above.

The rotating electric machine 20, a torque converter 50, a multi-stage automatic transmission 60, and a differential gear mechanism 70 are disposed in order between the engine 10 and right and left drive wheels 40R, 40L.

A friction clutch C1 is disposed between a base end side of a rotor shaft 21 of the rotating electric machine 20 and an output shaft 14 of the engine 10, a terminal end side of the rotor shaft 21 being connected to an input shaft (not shown) of the torque converter 50. The friction clutch C1 is configured to be able to switch between an engaged state and a disengaged state by using a known hydraulic pressure control device 80 based on the operation state of the vehicle and the friction clutch C1 may be a general multi-plate wet clutch. However, a claw clutch, an electromagnetic clutch, or the like can also be used as needed and the friction clutch C1 is not limited to the friction clutch C1 as described in the embodiment. In the embodiment, the friction clutch C1 enters a connected state when the engine 10 is started or output from the engine 10 is transferred toward the rotor shaft 21 of the rotating electric machine 20 and is basically in a disconnected state at other times.

The torque converter 50 in the embodiment is a torque converter that is able to switch the connection state between the input shaft side of the torque converter 50 and the output shaft 14 side of the engine 10 to a mechanically directly connected state by using the hydraulic pressure control device 80 based on the operation state of the vehicle and that is provided with a known lock-up clutch 51 (refer to FIG. 2). The lock-up clutch 51 enters a disconnected state in a low-load operating region that aims an increase in output torque of the engine 10 and is basically held in a connected state in other operating regions.

An input shaft (not shown) of the multi-stage automatic transmission 60 in which a plurality of frictional engaging elements 61 and a plurality of sets of planetary gear trains (not shown) are combined with each other is connected to an output shaft (not shown) of the torque converter 50. An output gear 63, with which an output shaft 62 of the multi-stage automatic transmission 60 is provided, meshes with a final reduction gear 71 of the differential gear mechanism 70 that is connected to drive shafts 41R, 41L of the right and left drive wheels 40R, 40L. The multi-stage automatic transmission 60 in the embodiment is an automatic transmission that is able to automatically and selectively switch the gear ratio between a backward one stage and forward eight stages. However, the multi-stage automatic transmission 60 is not limited to such an automatic transmission. In the multi-stage automatic transmission 60, the state of the frictional engaging elements 61 is selectively switched between an engaged state and a disengaged state by the hydraulic pressure control device 80 corresponding to the traveling speed of the vehicle, that is, the vehicle speed, and the throttle opening degree or the accelerator operation amount.

The vehicle speed is detected by a vehicle speed sensor S2, the throttle opening degree is detected by a throttle opening degree sensor S3, and information indicating the result of the detection is output to the ECU 30. In addition, a mechanical oil pump (not shown) for supplying automatic transmission oil to the torque converter 50 or the frictional engaging elements 61 of the multi-stage automatic transmission 60 via the hydraulic pressure control device 80 is built into the rotor shaft 21 of the rotating electric machine 20 or the input shaft of the torque converter 50.

A permanent magnet (not shown) is embedded in a rotor 22 of the rotating electric machine 20 to which the rotor shaft 21 is integrally connected and a stator 23 of the rotating electric machine 20 that surrounds the rotor 22 is provided with a coil 24, the coil 24 being connected to an in-vehicle high-voltage secondary battery 90 via an inverter IV. A rotating electric machine controller 33 of the ECU 30 controls the operation of the rotating electric machine 20 via the inverter IV based on the operation state of the vehicle including the state of charge (SOC) of the high-voltage secondary battery 90. Accordingly, the rotating electric machine 20 functions as a motor for applying a driving force to the drive wheels 40R, 40L or an alternator for supplying power to the high-voltage secondary battery 90.

In the embodiment, in a case where the vehicle is caused to travel forwards or travel backwards, the traveling mode is selectively switched between an EV traveling mode in which the rotating electric machine 20 is operated and an HV traveling mode in which at least the engine 10 is operated corresponding to output with respect to the drive wheels 40R, 40L, that is, the vehicle driving force. In addition, in a case where a brake switch S4 is in an ON state while the vehicle is traveling, a regenerative traveling mode is selected and in a case where the SOC of the in-vehicle high-voltage secondary battery 90 becomes equal to or smaller than a predetermined value, a charging mode is selected regardless of whether the vehicle is traveling or is not moving.

The SOC of the high-voltage secondary battery 90 is calculated by the operation state determination unit 31 of the ECU 30. Whether a brake pedal (not shown) is stepped on or not is detected by the brake switch S4 and information indicating the result of the detection is output to the ECU 30. In addition, the vehicle driving force is calculated from the stepping-on amount with respect to the accelerator pedal operated by the driver, that is, the accelerator operation amount and the vehicle speed and output of the engine 10 and the rotating electric machine 20 is calculated by multiplying the vehicle driving force by the vehicle speed.

The EV traveling mode is a mode in which the rotating electric machine 20 functions as a motor and output from the rotating electric machine 20 is transferred to the drive wheels 40R, 40L. The EV traveling mode is selected in the case of a low load where the vehicle is able to travel with an output value equal to or smaller than an output value that is obtained by subtracting output needed to start the engine 10 in a stopped state from maximum output of the rotating electric machine 20. In the EV traveling mode, the friction clutch C1 enters the disconnected state and the stopped state of the engine 10 is maintained.

The HV traveling mode is a mode in which the engine 10 is driven and the state of the friction clutch C1 is switched to the connected state such that output from at least the engine 10 is transferred to the drive wheels 40R, 40L. The HV traveling mode is selected in a case other than the above described case of a low load, that is, in a case where the vehicle is not able to travel with an output value equal to or smaller than the output value that is obtained by subtracting the output needed to start the engine 10 in the stopped state from the maximum output of the rotating electric machine 20. The output from the engine 10 in the HV traveling mode is applied as a power source for driving the drive wheels 40R, 40L with the engine 10 alone or with a combination of the engine 10 and the rotating electric machine 20.

Output to the drive wheels 40R, 40L can be calculated based on the rotation speed of the engine 10, the rated value of the rotating electric machine 20, and the rotation speed of the rotating electric machine 20. The output to the drive wheels 40R, 40L is calculated by the operation state determination unit 31 of the ECU 30 based on information detected by a crank angle sensor S5 or a transmission input shaft rotation speed sensor S6. However, the aspect of the disclosure is not limited to this. The accelerator operation amount, the throttle opening degree, the vehicle speed, the rotation speed of the output shaft 62 of the multi-stage automatic transmission 60, or the like also may be used.

The regenerative traveling mode is a mode in which the rotating electric machine 20 functions as the alternator in a case where the driver does not step on the accelerator pedal while the vehicle is traveling with the SOC of the high-voltage secondary battery 90 being smaller than the predetermined value or in a case where the brake pedal is stepped on with the SOC of the high-voltage secondary battery 90 being smaller than the predetermined value. In the regenerative traveling mode, rotation energy from the drive wheels 40R, 40L is stored in the high-voltage secondary battery 90 via the rotating electric machine 20 and the rotating electric machine 20 serves as a so-called regenerative brake. In the embodiment, for example, in a case where the brake switch S4 is turned on while the vehicle is traveling at a vehicle speed exceeding a reduced speed, the traveling mode is switched to the regenerative traveling mode. However, the aspect of the disclosure is not limited to this. In the regenerative traveling mode, the friction clutch C1 enters the disconnected state and fuel supply with respect to the engine 10 is stopped such that meaningless energy consumption can be further suppressed.

In the regenerative traveling mode, a regenerative torque is calculated by the ECU 30 according to the deceleration of the vehicle and the operation of the rotating electric machine 20 is controlled such that the calculated regenerative torque can be obtained. Requested deceleration of the vehicle pertaining to a case where a braking operation is performed can be calculated from the stepping-on amount with respect to the brake pedal and the vehicle speed. In the embodiment, in a case where the regenerative traveling mode is selected, a preset shift stage is selected according to the vehicle speed at a time point at which the regenerative traveling mode is selected. However, a shift stage may be selected according to the requested deceleration or the magnitude of the regenerative torque.

The charging mode is a mode in which the rotating electric machine 20 functions as the alternator in a case where the SOC of the high-voltage secondary battery 90 becomes smaller than a lower limit value and the rotating electric machine 20 is driven by using output from the engine 10 until the SOC of the high-voltage secondary battery 90 reaches a predetermined value that is greater than the lower limit value. However, the aspect of the disclosure is not limited to this. For example, in a case where the SOC of the high-voltage secondary battery 90 is within a range from the predetermined value to an upper limit value that is greater than the predetermined value, the ECU 30 determines that the high-voltage secondary battery 90 does not need to be charged and in a case where the vehicle is in a traveling state, output from the engine 10 is transferred to the drive wheels 40R, 40L, output from the rotating electric machine 20 is transferred to the drive wheels 40R, 40L, or output from both of the engine 10 and the rotating electric machine 20 is transferred to the drive wheels 40R, 40L. In a case where the charging mode is selected while the vehicle is traveling in the HV traveling mode, the rotating electric machine 20 functions as the alternator and all of output to the drive wheels 40R, 40L is transferred from the engine 10 alone. That is, the charging mode can be performed at the same time as the HV traveling mode and in this case, the engine 10 operates to achieve output that is obtained by adding output for driving the rotating electric machine 20 as the alternator to output needed to cause the vehicle to travel. In addition, in a case where the charging mode is selected while the vehicle is traveling in the EV traveling mode, the traveling mode is switched to the HV traveling mode even when the output to the drive wheels 40R, 40L is a low load and the function of the rotating electric machine 20 is switched to the alternator from the motor.

The engine 10 in the stopped state or in a rest state is started by switching the state of the friction clutch C1 to the connected state according to the operation state of the vehicle including the temperature of coolant of the engine 10 and by using the rotating electric machine 20 as a starter motor. The operation as described above is instantly performed even while the vehicle is traveling. The temperature of the coolant of the engine 10 is detected by a coolant temperature sensor S7 and information indicating the result of the detection is output to the ECU 30.

Meanwhile, the maximum output of the rotating electric machine 20 that can be used with respect to the drive wheels 40R, 40L corresponds to a value that is obtained by subtracting output needed to start the engine 10 in the stopped state from the rated output of the rotating electric machine 20.

Figure 4:
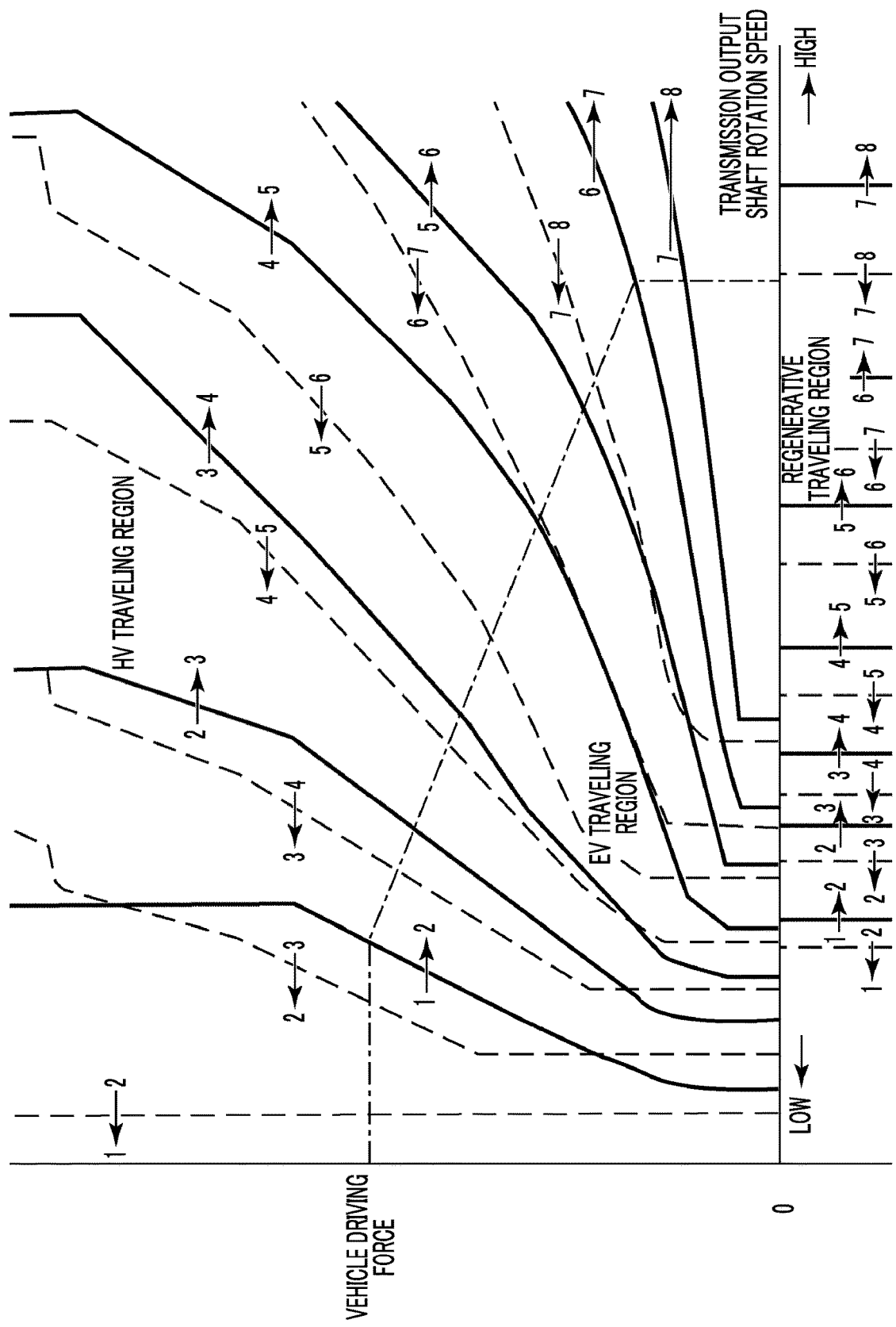
FIG. 4 illustrates shift maps that are selected in an HV traveling mode, an EV traveling mode, and the regenerative traveling mode in the embodiment illustrated in FIG. 1.

Shift maps illustrated in FIG. 4 are stored in the ECU 30 and a shift stage corresponding to each traveling mode is selected based on the vehicle speed and the vehicle driving force. Instead of the vehicle driving force, a parameter related to the vehicle driving force, for example, the accelerator operation amount or a requested driving force also can be used. Alternatively, a driving torque of the rotating electric machine can be used as the parameter related to the vehicle driving force in the EV traveling mode and the requested deceleration or the regenerative torque can be used as the parameter related to the vehicle driving force in the regenerative traveling mode. The upper half of the shift maps in FIG. 4 is selected in the case of the HV traveling mode and the EV traveling mode and the lower half of the shift maps is selected in the case of the regenerative traveling mode with a horizontal axis, at which the vehicle driving force is zero, being the boundary between the upper half and the lower half. However, in the embodiment, in a case where the traveling mode is switched from the regenerative traveling mode to the EV traveling mode, shift maps illustrated in FIG. 5 (which will be described later) are temporarily adopted instead of the shift maps illustrated in FIG. 4.

In addition, it is also effective to adopt shift maps different from the shift maps illustrated in FIG. 4 such that a gear ratio of a shift stage selected in the EV traveling mode tends to be greater than a gear ratio of a shift stage selected in the HV traveling mode under the same vehicle speed and the same parameter. The parameter is related to the vehicle driving force. For example, the parameter is the accelerator operation amount. This is because the most efficient rotation speed of the rotating electric machine 20 operating in the EV traveling mode is generally higher than the most efficient rotation speed of the engine 10.

Figure 3:
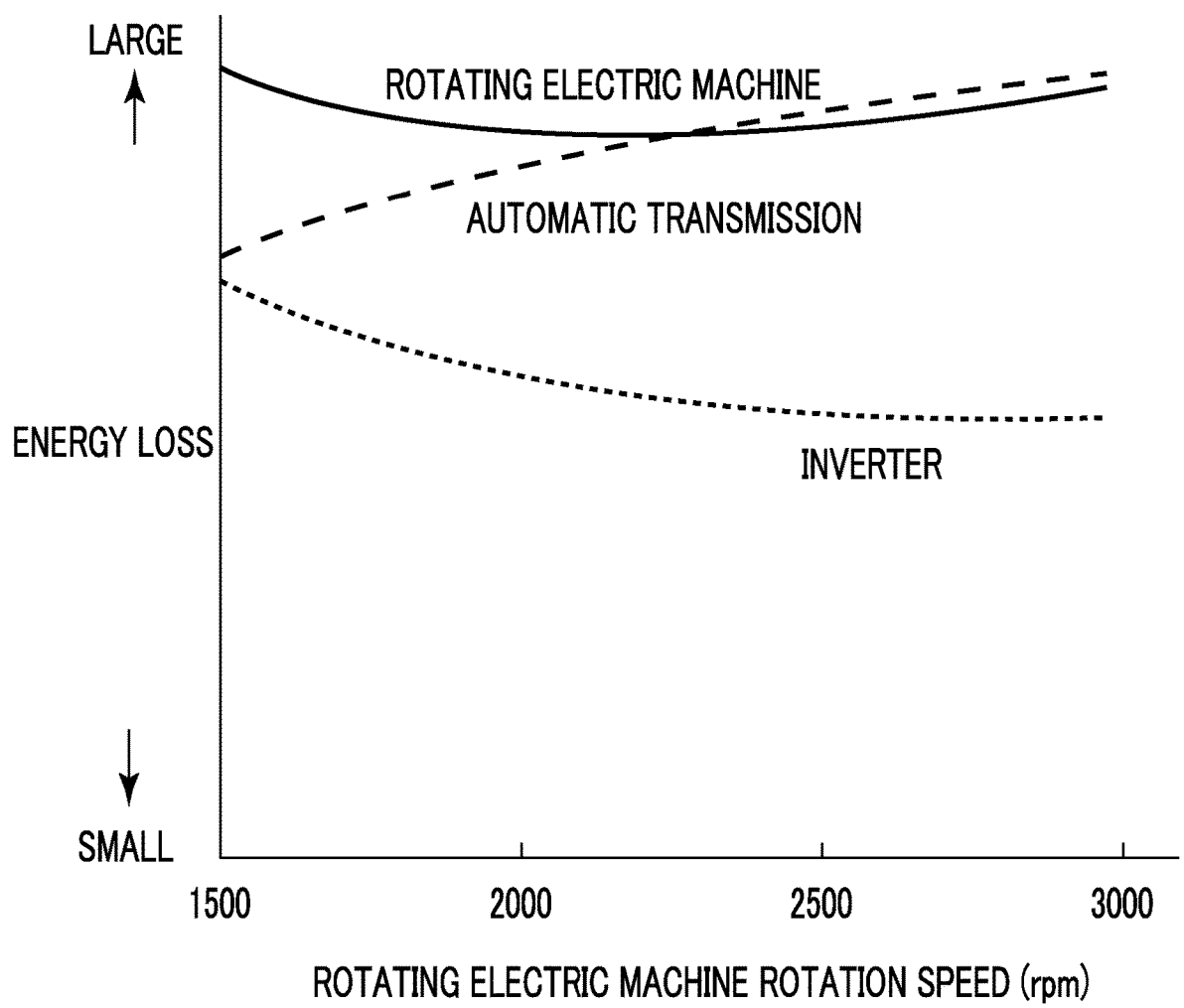
FIG. 3 is a graph illustrating a relationship between the rotation speed of the rotating electric machine in a regenerative traveling mode in the embodiment illustrated in FIG. 1 and the energy loss in each of the rotating electric machine, an automatic transmission, and an inverter.

Meanwhile, FIG. 3 schematically illustrates a relationship between the rotation speed of the rotating electric machine 20, the energy loss in the rotating electric machine 20, the energy loss in the multi-stage automatic transmission 60, and the energy loss in the inverter IV pertaining to a case where the rotating electric machine 20 functions as the alternator. As is apparent from FIG. 3, in a case where the rotating electric machine 20 functions as the alternator, as the rotation speed of the rotating electric machine 20 increases, the energy loss in the multi-stage automatic transmission 60 increases while the energy loss in the inverter IV decreases. In addition, it will be understood that the energy loss in the rotating electric machine 20 used in the embodiment is minimized at a certain rotation speed. The rotation speed of the rotating electric machine 20 at which the sum of the energy losses is minimized falls within a rotation region in which the rotation speed of the rotating electric machine 20 is lower than the above-described rotation speed at which the energy loss in the rotating electric machine 20 is minimized although the rotation speed of the rotating electric machine 20 at which the sum of the energy losses is minimized changes depending on which shift stage of the multi-stage automatic transmission 60 is selected and the lower the shift stage is, the higher the rotation speed is. That is, in the case of the regenerative traveling mode, a shift map in FIGS. 4 and 5 that is a region in which the driving force is smaller than zero, that is, a region in which the accelerator operation amount becomes 0% is selected such that the rotation speed of the rotating electric machine 20 falls within the rotation region, in which the rotation speed of the rotating electric machine 20 is lower than the above-described rotation speed at which the energy loss in the rotating electric machine 20 is minimized, regardless of the vehicle speed or the throttle opening degree. In the shift map for the regenerative traveling mode in FIGS. 4 and 5 that is selected in a region where the vehicle driving force is smaller than zero, the rotation speed of the rotating electric machine 20 in the regenerative traveling mode pertaining to a situation where the vehicle speed is a predetermined vehicle speed and the vehicle driving force is smaller than zero is higher than the rotation speed of the rotating electric machine 20 in the HV traveling mode and the EV traveling mode pertaining to a situation where the vehicle speed is the predetermined vehicle speed and the vehicle driving force is greater than zero while being close at least to zero. This is because the engine 10 and the rotating electric machine 20 are different from each other in most efficient rotation speed and this is because the output decreases, an EV traveling region becomes narrow, and the vehicle efficiency decreases when a high-rotation region is used in the EV traveling mode.

Figure 5:
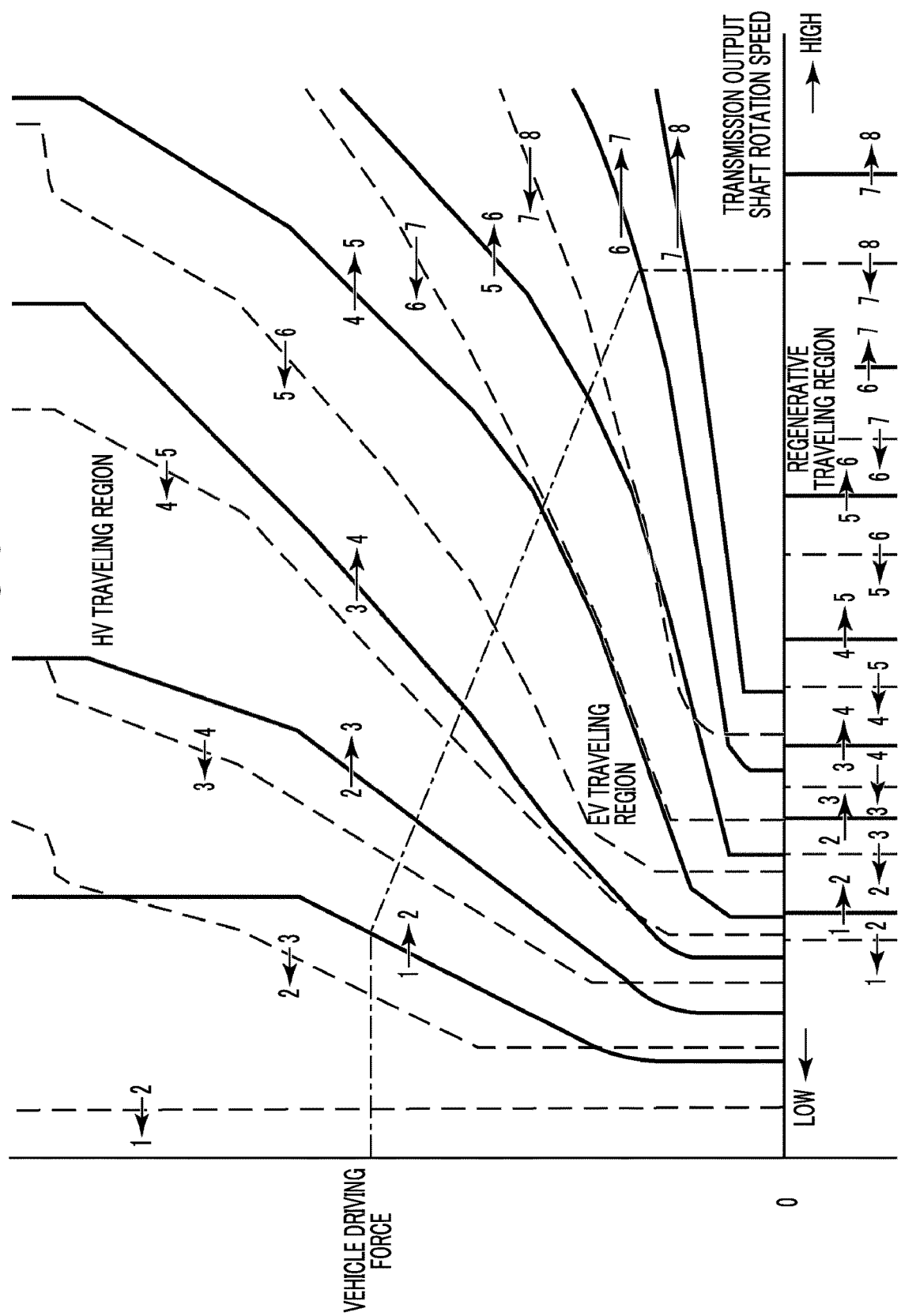
FIG. 5 illustrates a shift map for the EV traveling mode that is selected immediately after the traveling mode is switched from the regenerative traveling mode to the EV traveling mode in the embodiment illustrated in FIG. 1 and also illustrates the shift map for the regenerative traveling mode illustrated in FIG. 4.

For a predetermined period of time, for example, for six seconds after the traveling mode is switched from the regenerative traveling mode to the EV traveling mode, a shift map for the EV traveling mode in FIG. 5 that is selected in a region in which the driving force is equal to or greater than zero is adopted instead of a shift map illustrated in FIG. 4. The shift map illustrated in FIG. 4 is set such that a gear ratio of a shift stage is greater than that in the EV traveling mode and the HV traveling mode under the same vehicle speed and the same accelerator operation amount, particularly in a low-accelerator operation amount region. This is for maintaining the rotation speed of the rotating electric machine 20 at the high-rotation region where efficiency becomes favorable and for improving fuel efficiency.

As described above, the lower half of the shift maps illustrated in FIG. 5 is selected in the case of the regenerative traveling mode and the upper half of the shift maps is a shift map for the EV traveling mode that is selected for a predetermined period of time in a case where the traveling mode is switched from the regenerative traveling mode to the EV traveling mode with a horizontal axis, at which the vehicle driving force is zero, being the boundary between the upper half and the lower half. Therefore, after the predetermined period of time elapses after the traveling mode is switched from the regenerative traveling mode to the EV traveling mode, a shifting operation is performed in accordance with the shift maps illustrated in FIG. 4 that correspond to the EV traveling mode and the HV traveling mode.

Figure 6:
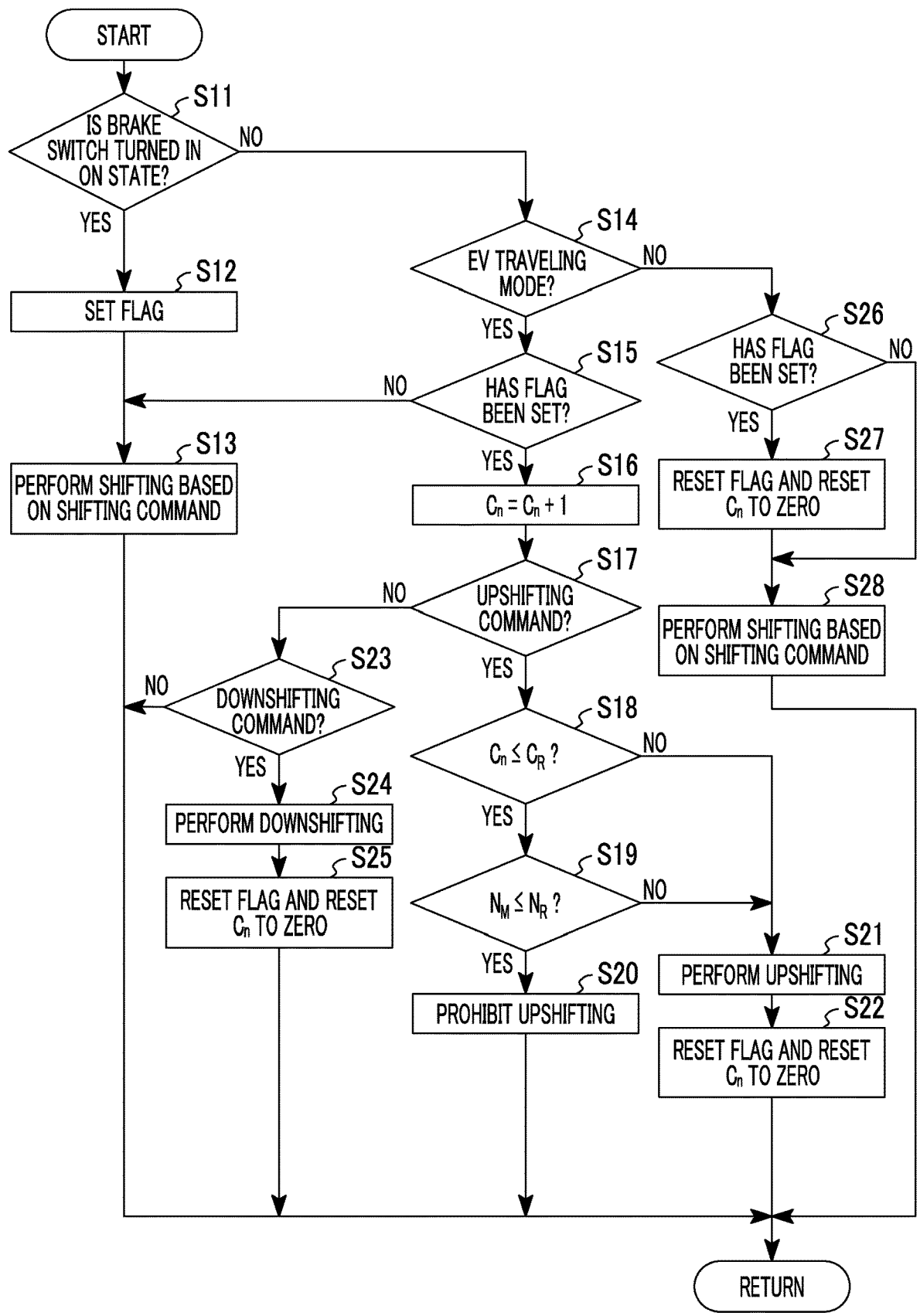
FIG. 6 is a flowchart illustrating a shifting control procedure in the embodiment illustrated in FIG. 1.

A shifting control procedure in the embodiment will be described next with reference to a flowchart in FIG. 6. First, in step S11, determination is made on whether the brake switch S4 is in an ON state. In a case where determination is made that the brake switch S4 is in an ON state, that is, determination is made that the regenerative traveling mode has been selected, the process proceeds to step S12 and a flag is set. Thereafter, the process proceeds to step S13 and the shifting operation is performed based on the shift map for the regenerative traveling mode illustrated in FIGS. 4 and 5.

Meanwhile, in a case where determination is made that the brake switch S4 is not in the ON state in step S11, that is, determination is made that the regenerative traveling mode has not been selected, the process proceeds to step S14 and determination is made on whether the EV traveling mode has been selected or not. In a case where determination is made that the EV traveling mode has been selected, in step S15, determination is made on whether the flag that is set in step S12 has been set. In a case where determination is made that the flag has been set, that is, determination is made that a mode selected immediately before the traveling mode is switched to the current EV traveling mode is the regenerative traveling mode, the process proceeds to step S16 and a timer counts up. Thereafter, in step S17, determination is made on whether an upshifting command has been issued based on the shift map for the EV traveling mode illustrated in FIG. 5. In a case where determination is made that the upshifting command has been issued, the process proceeds to step S18 and determination is made on whether the count value $C_n$ of the timer is equal to or smaller than a threshold value $C_R$. In a case where determination is made that the count value $C_n$ of the timer is equal to or smaller than the threshold value $C_R$, that is, determination is made that a short period of time, for example, a time less than three seconds has elapsed after the traveling mode is switched from the regenerative traveling mode to the EV traveling mode, the process proceeds to step S19. Then, determination is made on whether a rotation speed $N_M$ of the rotor shaft 21 of the rotating electric machine 20 is equal to or smaller than a threshold value $N_R$. In a case where determination is made that the rotation speed $N_M$ of the rotor shaft 21 of the rotating electric machine 20 is equal to or smaller than the threshold value $N_R$, that is, determination is made that it is possible to start the engine 10 without performing upshifting, the process proceeds to step S20. Then, the upshifting operation is prohibited with respect to the upshifting command in step S17 and the process returns to step S11 again.

As described above, in step S20, the upshifting operation is completely prohibited but in a case where the upshifting operation is an upshifting operation of upshifting to a shift stage that is different from a current shift stage by two stages or more, a one-stage upshifting operation may be performed, for example.

In a case where determination is made that the count value $C_n$ of the timer is greater than the threshold value $C_R$ in step S18, that is, determination is made that there is no rapid change in operation state of the vehicle after switching to the EV traveling mode, the process proceeds to step S21 and upshifting is performed based on the shift map for the EV traveling mode illustrated in FIG. 5. Thereafter, in step S22, the flag is reset, the count value $C_n$ of the timer is reset to zero, and the process returns to step S11 again. In addition, similarly, in a case where determination is made that the rotation speed $N_M$ of the rotor shaft 21 of the rotating electric machine 20 is greater than the threshold value $N_R$ in step S19, the process proceeds to step S21 and the upshifting is performed based on the shift map for the EV traveling mode illustrated in FIG. 5. This is because in a case where the upshifting is not performed here, the rotation speed $N_M$ of the rotor shaft 21 of the rotating electric machine 20 becomes excessively high and there is a possibility that a change in operation state of the vehicle may result in busy shifting.

As described above, in a case where the brake switch S4 is switched to the OFF state from the ON state and the first shifting command within a predetermined period of time after transition to the EV traveling mode is the upshifting command, the upshifting operation is prohibited when the rotation speed of the rotating electric machine 20 is lower than a predetermined speed. Accordingly, it is possible to suppress a possibility of busy shifting with respect to a change in the operation state of the vehicle that may occur thereafter and it is possible to efficiently prevent deterioration in drivability.

Meanwhile, in a case where determination is made that the upshifting command has not been issued in step S17, the process proceeds to step S23 and determination is made on whether a downshifting command has been issued based on the shift map for the EV traveling mode illustrated in FIG. 5. In a case where determination is made that the downshifting command has been issued, the process proceeds to step S24 and downshifting is performed. Thereafter, the process proceeds to step S25, the flag is reset, the count value $C_n$ of the timer is reset to zero, and the process returns to step S11 again.

In a case where determination is made that the downshifting command has also not been issued in step S23, the process returns to step S11.

In addition, in a case where determination is made that the flag has not been set in step S15, that is, determination is made that the mode selected immediately before the traveling mode is switched to the current EV traveling mode is not the regenerative traveling mode, the process proceeds to step S13. Then, the shifting operation based on the shift map for the EV traveling mode illustrated in FIG. 4 is performed.

Furthermore, in a case where determination is made that the EV traveling mode has not been selected in step S14, that is, determination is made that the HV traveling mode has been selected, the process proceeds to step S26 and determination is made on whether the flag has been set once more. In a case where determination is made that the flag has been set, that is, determination is made that the mode selected immediately before the traveling mode is switched to the current HV traveling mode is the regenerative traveling mode, the process proceeds to step S27, the flag is reset, and the count value $C_n$ of the timer is reset to zero. Thereafter, the process proceeds to step S28 and the process returns to step S11 again after the shifting operation is performed based on the shift map for the HV traveling mode illustrated in FIG. 4.

In a case where determination is made that the flag has not been set in step S26, that is, determination is made that the mode selected immediately before the traveling mode is switched to the current HV traveling mode is not the regenerative traveling mode, the process proceeds to step S28. Then, the process returns to step S11 after the shifting operation is performed based on the shift map for the HV traveling mode.

In the embodiment, the flag is set based on an ON signal of the brake switch S4, that is, the regenerative traveling mode is selected based on the ON signal of the brake switch S4. However, the flag may be set based on an OFF signal of an accelerator switch. That is, even when the brake pedal is not stepped on by the driver while the vehicle is traveling, in a case where an accelerator is released with the accelerator pedal being not stepped on, there is a possibility that determination is made that the driver does not want to accelerate the vehicle. Therefore, transition to the regenerative traveling mode may be performed based on any of the ON signal of the brake switch S4 and the OFF signal of the accelerator switch, that is, the flag may be set based on any of the ON signal of the brake switch S4 and the OFF signal of the accelerator switch.

In addition, in a case where the traveling mode is switched to the EV traveling mode and the upshifting command is issued with the flag being set in step S12, switching between the shift stages may be performed based on the shift map for the usual EV traveling mode illustrated in FIG. 4 instead of the shift map for the EV traveling mode that is illustrated in FIG. 5 and is selected in step S21.

As described above, the aspect of the disclosure should be interpreted mainly based on the matters described in claims, and various modifications and alterations that are included in the concept of the aspect of the disclosure but not described can also be made for the embodiment. For example, the aspect of the disclosure can also be applied to an autonomous driving system in which a requested driving force of the vehicle is automatically calculated. That is, all of the matters included in the embodiment are not for limiting the aspect of the disclosure and the matters and structures that are not directly related to the aspect of the disclosure can be arbitrarily changed in accordance with the usage or the purpose thereof.

What is claimed is:

1. A shift control device for a hybrid vehicle in which an internal combustion engine configured to drive drive wheels, a rotating electric machine configured to drive the drive wheels as a motor and to supply power to an in-vehicle secondary battery as a power generator, and a multi-stage automatic transmission that is disposed between the internal combustion engine and the drive wheels and between the rotating electric machine and the drive wheels and that achieves one of a plurality of shift stages are installed, and in which an EV traveling mode that is selected in a low-drive region where a vehicle driving force is greater than zero and in which fuel is not supplied to the internal combustion engine and output from the rotating electric machine is transferred to the drive wheels, an HV traveling mode that is selected in a high-drive region where the vehicle driving force is greater than the vehicle driving force in the low-drive region and in which output from at least the internal combustion engine out of the internal combustion engine and the rotating electric machine is transferred to the drive wheels, and a regenerative traveling mode that is selected in a region where the vehicle driving force is smaller than zero and in which power obtained when the rotating electric machine is driven with rotation energy from the drive wheels is stored in the secondary battery when an accelerator is released while the vehicle is traveling are set, the shift control device comprising an electronic control unit, wherein:

the electronic control unit is configured to control switching between the shift stages in the multi-stage automatic transmission based on a vehicle speed and a parameter related to the vehicle driving force;

the electronic control unit is configured to control the switching between the shift stages in the multi-stage automatic transmission such that a gear ratio that is selected at a predetermined vehicle speed and is selected in the regenerative traveling mode that is a boundary region with respect to the EV traveling mode becomes greater than a gear ratio that is selected at the predetermined vehicle speed and is selected in the HV traveling mode that is a boundary region with respect to the EV traveling mode; and the electronic control unit is configured to control the switching between the shift stages in the multi-stage automatic transmission such that a gear ratio of a shift stage that is selected in a case where a traveling mode is switched from the regenerative traveling mode to the EV traveling mode is greater than a gear ratio of a shift stage that is selected in a case where the traveling mode is switched from the HV traveling mode to the EV traveling mode under the same vehicle speed and the same parameter in a case where the traveling mode is switched from the regenerative traveling mode to the EV traveling mode and in a case where the traveling mode is switched from the HV traveling mode to the EV traveling mode.

2. The shift control device according to claim 1, wherein the electronic control unit is configured to perform upshifting to a shift stage that is equal to or lower than a shift stage pertaining to a case where the traveling mode is switched from the HV traveling mode to the EV traveling mode after a shift stage is maintained for a predetermined time, in a case where the traveling mode is switched from the regenerative traveling mode to the EV traveling mode.

3. The shift control device according to claim 2, wherein the electronic control unit is configured to perform the upshifting to the shift stage that is equal to or lower than the shift stage pertaining to the case where the traveling mode is switched from the HV traveling mode to the EV traveling mode without maintaining the shift stage for the predetermined time in a case where the traveling mode is switched from the regenerative traveling mode to the EV traveling mode and a rotation speed of the rotating electric machine is higher than a predetermined rotation speed.

4. The shift control device according to claim 1, wherein the electronic control unit is configured to control the switching between the shift stages in the multi-stage automatic transmission such that a gear ratio of a shift stage that is selected in the EV traveling mode in the boundary region between the HV traveling mode and the EV traveling mode becomes equal to or greater than a gear ratio of a shift stage that is selected in the HV traveling mode under the same vehicle speed and the same parameter.

5. A shift control method for a hybrid vehicle in which an internal combustion engine configured to drive drive wheels, a rotating electric machine configured to drive the drive wheels as a motor and to supply power to an in-vehicle secondary battery as a power generator, and a multi-stage automatic transmission that is disposed between the internal combustion engine and the drive wheels and between the rotating electric machine and the drive wheels and that achieves one of a plurality of shift stages are installed, and in which an EV traveling mode that is selected in a low-drive region where a vehicle driving force is greater than zero and in which fuel is not supplied to the internal combustion engine and output from the rotating electric machine is transferred to the drive wheels, an HV traveling mode that is selected in a high-drive region where the vehicle driving force is greater than the vehicle driving force in the low-drive region and in which output from at least the internal combustion engine out of the internal combustion engine and the rotating electric machine is transferred to the drive wheels, and a regenerative traveling mode that is selected in a region where the vehicle driving force is smaller than zero and in which power obtained when the rotating electric machine is driven with rotation energy from the drive wheels is stored in the secondary battery when an accelerator is released while the vehicle is traveling are set, the shift control method comprising:

controlling switching between the shift stages in the multi-stage automatic transmission based on a vehicle speed and a parameter related to the vehicle driving force;

controlling the switching between the shift stages in the multi-stage automatic transmission such that a gear ratio that is selected at a predetermined vehicle speed and is selected in the regenerative traveling mode that is a boundary region with respect to the EV traveling mode becomes greater than a gear ratio that is selected at the predetermined vehicle speed and is selected in the HV traveling mode that is a boundary region with respect to the EV traveling mode; and controlling the switching between the shift stages in the multi-stage automatic transmission such that a gear ratio of a shift stage that is selected in a case where a traveling mode is switched from the regenerative traveling mode to the EV traveling mode is greater than a gear ratio of a shift stage that is selected in a case where the traveling mode is switched from the HV traveling mode to the EV traveling mode under the same vehicle speed and the same parameter in a case where the traveling mode is switched from the regenerative traveling mode to the EV traveling mode and in a case where the traveling mode is switched from the HV traveling mode to the EV traveling mode.

* * * * *